(12) United States Patent
Thiessen et al.

(10) Patent No.: US 6,962,401 B2
(45) Date of Patent: Nov. 8, 2005

(54) METHODS AND SYSTEMS FOR OPERATING INKJET PRINTERS ON PRODUCTION LINES

(75) Inventors: Kurt E. Thiessen, San Diego, CA (US); Robert Fogarty, San Diego, CA (US); Ronald D. Stephens, Jr., Poway, CA (US); Josep-Maria Serra, San Diego, CA (US); Mark McGarry, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/620,255

(22) Filed: Jul. 15, 2003

(65) Prior Publication Data

US 2005/0012768 A1 Jan. 20, 2005

(51) Int. Cl.[7] .............................................. B41J 29/393
(52) U.S. Cl. ........................................................ 347/19
(58) Field of Search ................................ 347/19, 14, 4, 347/23; 709/224; 53/52–58, 64–76, 493–506; 198/341.01

(56) References Cited

U.S. PATENT DOCUMENTS

| | | | | |
|---|---|---|---|---|
| 3,603,585 A | * | 9/1971 | Maloney et al. ............. 271/259 |
| 4,019,187 A | * | 4/1977 | Omori et al. .................... 347/4 |
| 4,415,048 A | * | 11/1983 | Teraoka ........................... 177/5 |
| 5,114,128 A | * | 5/1992 | Harris et al. ................ 270/1.03 |
| 5,806,994 A | * | 9/1998 | Coffy et al. ............ 400/120.01 |
| 5,912,680 A | * | 6/1999 | Uchida et al. ................. 347/23 |
| 5,912,979 A | * | 6/1999 | Gavrilos ...................... 382/101 |
| 6,243,109 B1 | * | 6/2001 | Ishinaga et al. ................ 347/3 |
| 6,681,245 B1 | * | 1/2004 | Sasagawa .................... 709/206 |

FOREIGN PATENT DOCUMENTS

| | | |
|---|---|---|
| EP | 0416849 A2 | 3/1991 |
| EP | 0467648 A1 | 1/1992 |
| EP | 0911765 A2 | 4/1999 |
| GB | 2272185 A | 5/1994 |
| JP | 61237654 | 10/1986 |

OTHER PUBLICATIONS

U.S. Appl. No. 10/078,455, Uetsuki et al., dated Sep. 12, 2002.

Search Report for European Patent Application No. EP04254066. Search completed Mar. 17, 2005.

* cited by examiner

Primary Examiner—Thinh Nguyen

(57) ABSTRACT

Various embodiments include methods and systems for monitoring a production line for non-printing events, and responsive to detecting an event, ascertaining whether an operation can be effected with an inkjet printer stationed along the production line.

7 Claims, 4 Drawing Sheets

METHODS AND SYSTEMS FOR OPERATING INKJET PRINTERS ON PRODUCTION LINES

TECHNICAL FIELD

This invention relates to methods and systems for operating inkjet printers. More particularly, the invention concerns methods and systems for operating inkjet printers that are utilized in connection with production lines, such as manufacturing lines.

BACKGROUND

Inkjet printers can be, and often are incorporated into production lines such as manufacturing lines. Specifically, such production lines typically process articles and, at some point in the production process, may either print on the article itself, or print on some label that is applied to or already affixed to the article. In many of these types of production lines, the printing operation may not necessarily be the primary operation that is performed, but rather constitutes an ancillary operation.

Generally, there are different types of operations that an inkjet printer can perform. Some of these operations involve the actual act of printing, and other operations pertain to, or in some way support the actual act of printing.

As an example of one of these latter types of operation, consider self-maintenance and servicing operations. In the context of inkjet printers, such self-maintenance and servicing operations can include such things as spitting an amount of ink to "warm up" the inkjet pen or cartridge, wiping the pen to reduce the likelihood of clogging, and capping the pen to keep the nozzles adequately hydrated.

In the production line context, the inkjet printer is often a standalone component and the printing operation is triggered by a sensor that is located very close in proximity to the printer. Because of the close proximity of such sensors, it is often the case that the inkjet printer has very little time to prepare for a printing operation.

SUMMARY

Various embodiments comprise methods and systems for monitoring a production line for non-printing events, and responsive to detecting an event, ascertaining whether an operation can be effected with an inkjet printer stationed along the production line.

BRIEF DESCRIPTION OF THE DRAWINGS

The same numbers are used throughout the drawings to reference like features and components.

DETAILED DESCRIPTION

Overview

Various embodiments comprise methods and systems for monitoring a production line for non-printing events, and responsive to detecting an event, ascertaining whether an operation can be effected with an inkjet printer stationed along the production line.

Exemplary Printing Device Embodiment

Figure 1:
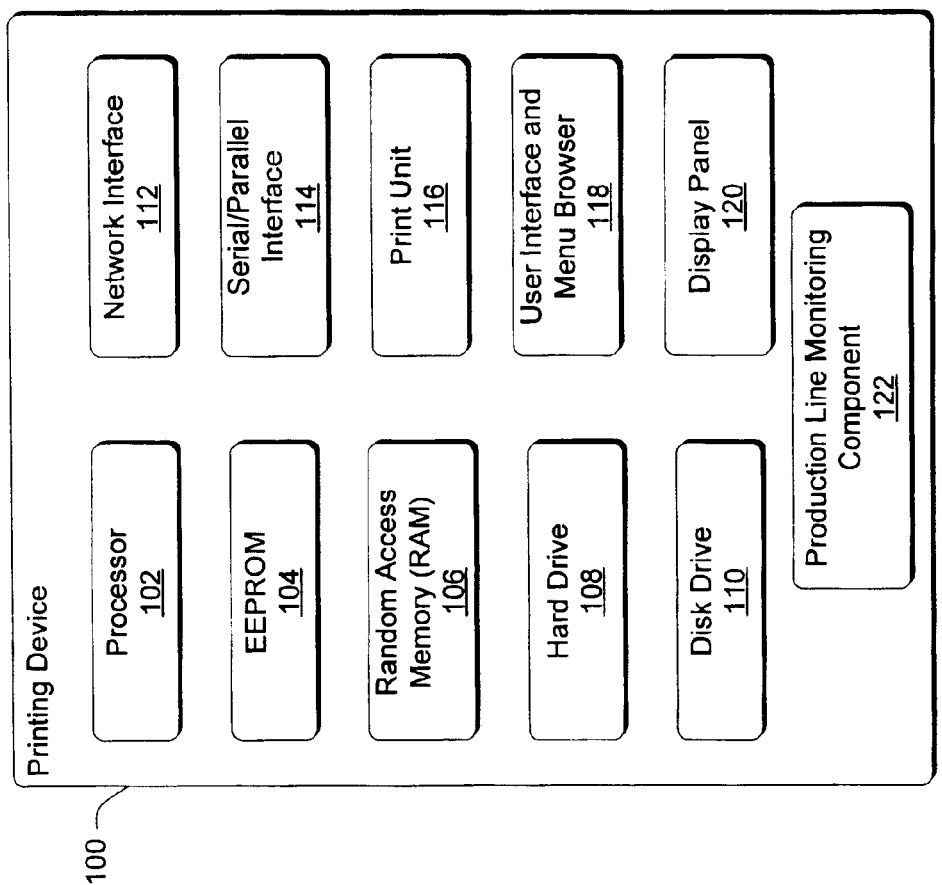
FIG. 1 is a block diagram showing exemplary components of an inkjet printing device in accordance with one embodiment.

FIG. 1 is a block diagram showing exemplary components of an inkjet printing device in the form of an inkjet printer 100 that can be used in accordance with one or more of the embodiments described below.

While FIG. 1 illustrates a specific type of inkjet printing device, it should be appreciated that other inkjet printing devices can be utilized without departing from the spirit and scope of the claimed subject matter. In addition, the term "printer" or "printing device" as used in this document will be understood to include multi-function devices that, in addition to inkjet printing, perform additional functions. Such additional functions can include, without limitation, one or more of the following: faxing, copying, scanning and the like.

Printer 100 includes a processor 102 and at least one computer-readable media. In this example, the computer readable media can include an electrically erasable programmable read-only memory (EEPROM) 104 and a random access memory (RAM) 106. Further, the computer-readable media can include a hard drive 108. Processor 102 processes various instructions to operate the printer 100 and communicate with other devices. Processor 102 can include a printer controller. Part of the job of a printer controller is to take data associated with a user's print job, and process it to provide data that is used to operate the printer. For example, an inkjet printer's controller can take data associated with a print job and convert it into raster data that can be used to fire pens of a print cartridge.

The EEPROM 104, RAM 106, and/or hard drive 108 can store various information such as configuration information, fonts, templates, data being printed, and menu structure information.

In addition, although not shown in FIG. 1, a particular printer may also contain a ROM (non-erasable) in place of or in addition to EEPROM 104. Furthermore, a printer may alternatively contain a flash memory device in place of or in addition to EEPROM 104.

Printer 100 can also include a disk drive 110, a network interface 112, and a serial/parallel interface 114. Disk drive 110 provides additional storage for data being printed or other information used by the printer 100. Although both RAM 106 and disk drive 110 are illustrated in FIG. 1, a particular printer may contain either RAM 106 or disk drive 110, depending on the storage needs of the printer. For example, an inexpensive printer may contain a small amount of RAM 106 and no disk drive 110, thereby reducing the manufacturing cost of the printer.

Network interface 112 provides a connection between printer 100 and a data communication network. Network interface 112 allows devices coupled to a common data communication network to send print jobs, menu data, and other information to printer 100 via the network. The network interface can be embodied as a network server and, more particularly, as a Web server. As a network server or Web server, the network interface can enable a user to access the printer using standard network protocols. For example, as a Web server, the network interface can enable two-way communication with one or more clients via standard network protocols such as TCP/IP.

Serial/parallel interface 114 can also provide a data communication path directly between printer 100 and another device, such as a workstation, server, or other computing device. Although the printer 100 shown in FIG. 1 has two interfaces (network interface 112 and serial/parallel interface 114), a particular printer may only contain one interface.

Printer 100 also includes a print unit 116 that can comprise a print engine. As such, the print unit 116 can comprise mechanisms that are arranged to selectively apply fluid or ink (e.g., liquid ink, toner, etc.) to a print media (e.g., paper, plastic, fabric, etc.) in accordance with print data within a print job. Accordingly, in the embodiments described below, the print unit 116 comprises an inkjet print unit or print engine that utilizes principles of inkjet printing. Those skilled in the art will recognize that there are many different types of print units or print engines available, and that for the purposes of the present discussion, print unit 116 can include any of these various types.

Printer 100 can also contain a user interface/menu browser 118 and a display panel 120. User interface/menu browser 118 allows the user of the printer to navigate the printer's menu structure. User interface 118 may be a series of buttons, switches or other indicators that are manipulated by the user of the printer. Display panel 120 is a graphical display that provides information regarding the status of the printer and the current options available through the menu structure.

In one embodiment, printer 100 can include a production line monitoring component 122 that is configured to monitor a production line, as will become apparent below. In other embodiments, the production line monitoring component can be distributed outside of, but in communication with, printer 100. In some embodiments, the production line monitoring component is embodied in software that can reside on a computer-readable media, such as in flash memory, the printer's hard drive, or drawn off of an Ethernet from a database, to name just a few media.

The illustrated printer may include software that provides a runtime environment in which software applications or applets can run or execute. The runtime environment can facilitate the extensibility of the printer by allowing various interfaces to be defined that, in turn, allow applications or applets to interact with the printer in more robust manners.

It will be appreciated that the techniques and methods described herein can include all forms of computer-readable media when such media contains instructions which, when executed by a processor or computer, implement the techniques and methods.

Exemplary Systems

Figure 2:
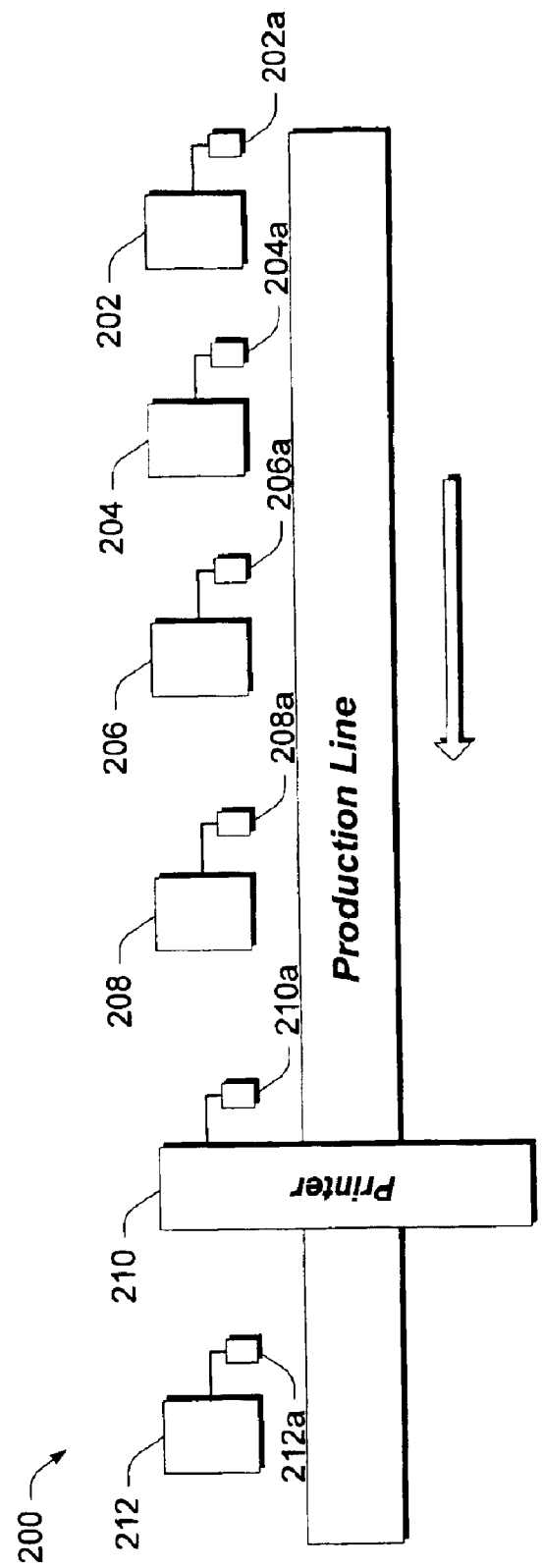
FIG. 2 is a block diagram of an exemplary production line in accordance with one embodiment.

FIG. 2 shows an exemplary production line generally at 200. The production line can comprise any suitable type of production line in which inkjet printing is performed as one or more of the operations. One non-exclusive, non-limiting characteristic of one type of production line in which the various embodiments can be utilized is that the printing operation is not typically the primary operation that is being performed. That is, the printing operation is often an ancillary type of operation that is performed. For example, the production line might be one in which a product is produced and packaged for distribution. Exemplary products can include such things as materials that are sold in bottles, boxes, bags and the like. The types of printing operations that can be performed in these types of scenarios include such operations as printing on portions of labels, printing lot numbers, printing tracking codes, and the like.

It is to be appreciated and understood that there are simply innumerable numbers and types of production lines in which the various embodiments may be employed.

Production lines, such as the one shown at 200, typically have one or more stations at which various operations take place. In the illustrated example, production line 200 comprises stations 202, 204, 206, 208, 210, and 212. In this example, one of the stations—station 210—is dedicated to inkjet printing. So, each of the other stations 202–208, and 212 can perform some type of operation that is not a printing operation. Perhaps stations 202, 204 prepare a product for packaging and stations 206, 208 place the product in a package and seal the package, respectively. Once the package is sealed in its package, the package is advanced to printing station 210 where, for example, a bar code might be inkjet printed on the side of the package. Once the bar code is printed on the side of the package, station 212 might verify that the bar code was printed correctly.

Typically, in a production line such as the one illustrated in FIG. 2, individual stations are equipped with some type of sensor that is utilized in connection with the operation that is performed at the associated station. In the FIG. 2 example, each of the stations is shown to have an associated sensor that is designated with the suffix "a". Accordingly, station 202 has a sensor 202a and so on. These sensors can be used to sense many different things. These different things can include, without limitation, sensing the presence of a product, sensing that an operation is being performed, sensing that an operation is not being performed, sensing that a product is not present, sensing that a product has just left the station, sensing that the station is or is not performing as intended, to name just a few.

Monitoring the Production Line to Intelligently Effect An Operation with the Inkjet Printer In accordance with one embodiment, a production line monitoring component monitors the production line to intelligently effect an operation with the inkjet printer. The operation that can be effected can be any suitable operation.

For example, in one embodiment, the operation that can be effected can be a printing operation in which ink is applied to an intended print medium. The term "intended print medium" is intended to mean a print medium that typically passes through a printer with the purpose of being printed upon by the printer. So, for example, an intended print medium can comprise such media as paper, transparencies, plastic, fabric and the like. For example, the production line monitoring component might monitor the production line and determine that the printer is required to print on a print medium every twenty seconds. Since there are twenty seconds between print jobs, the production line monitoring component might cause the printer to select a higher quality printmode such that, instead of printing a particular lot number at 300 dpi, the printer prints the lot number at 600 dpi.

In another embodiment, alternately or additionally, the operation that can be effected can be an operation in which ink is not applied to an intended print medium. For example, an operation in which ink is not applied to an intended print medium can be a service-related operation such as a spitting, wiping and/or capping operation associated with an inkjet pen. Specifically, in inkjet printers, the inkjet printheads can be the subject of some service-related operations whose intent is to preserve the integrity of the printed subject matter. For example, one of the things that is typically done to get the printheads ready for printing is to preliminarily test fire nozzles of the printhead (i.e. conduct a spitting operation) to warm it up before an intended print medium is printed upon. That is, over time, if a printhead sits idle, the pigment that is used can separate out from the carrier. As a result, the first couple drops out of the printhead may tend to be clear because the carrier in which the ink is carried is clear. Eventually, after the printhead is fired a few times, the color may return to the material that is ejected from the printhead. Thus, if one pre-fires a few drops ahead of time, one can increase the chances that the drops that are eventually ejected onto an intended print medium will have the correct color.

Another service-related operation that can be performed is directed to removing an accumulated buildup of material around the printhead nozzles. This helps to ensure that ink is ejected in the proper manner from the nozzles. Thus, in this instance, a wiping operation can reduce the likelihood that material will build up and clog the printhead's nozzles.

Another service-related operation is a capping operation in which the pen that houses the nozzles is capped with a cap to keep the nozzles properly hydrated.

These service-related operations, as well as other operations, take time to perform. Thus, in the production line context, the time to perform a spitting operation may take only two seconds and the time to perform a wiping operation may take 5–7 seconds. By virtue of the fact that the production line monitoring component monitors the production line, the component can take steps to intelligently effect an operation with the printer.

As an elementary example, consider the following. If the production line monitoring component notices that there has been an unexpected stoppage of the production line, then the component might cause a wiping operation to be performed by the printer during the stoppage. Additionally, if this stoppage lasts for a certain amount of time, then the production line monitoring component might cause the inkjet pen or pens to be capped. Additionally, after the production line starts back up, the production line monitoring component might cause the inkjet pens to undergo a spitting operation to warm up the pens.

Figure 3:
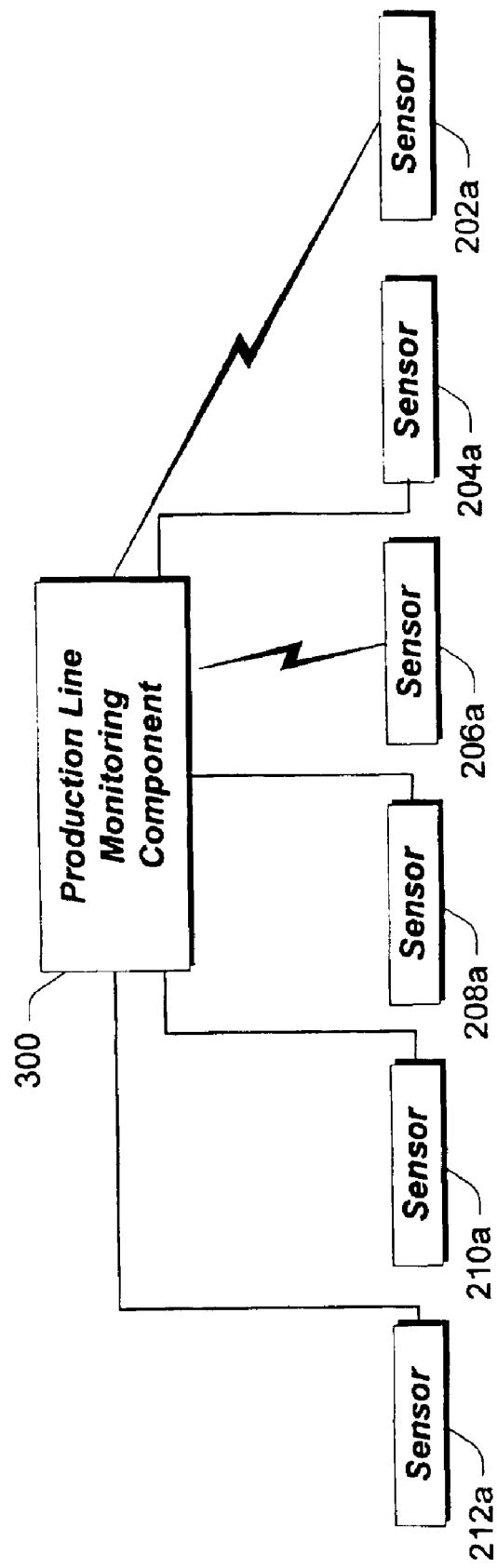
FIG. 3 is a block diagram of an exemplary production line monitoring component in accordance with one embodiment.

As an example, consider FIG. 3, which shows an exemplary production line monitoring component 300 in accordance with one embodiment. In this example, individual sensors of the production line are communicatively linked with the production line monitoring component 300. Recall that these individual sensors correspond to the sensors that are associated with the individual stations above. These sensors include both upstream sensors (i.e. sensors that are upstream from the printer) and downstream sensors (i.e. sensors that are downstream from the printer).

Here, sensors 202a and 206a are wirelessly linked for communication with the production line monitoring component 300. Wirelessly linking these sensors can be accomplished using any suitable wireless technology (e.g. infrared, RF, cellular-based, etc). Sensors 204a, 208a, 210a, and 212a are linked via wire to the production line monitoring component. Sensors 202a–208a are upstream sensors, and sensor 212a is a downstream sensor.

If the sensors detect a condition associated with the production line such as a stoppage, or some other type of condition, the production line monitoring component 300 can process the condition that is detected and can then, if appropriate, intelligently effect an operation with the printer. In this manner, a printer's operations can be dynamically adapted to the production line environment, and to various things that can happen in this environment.

Exemplary Methods

Figure 4:
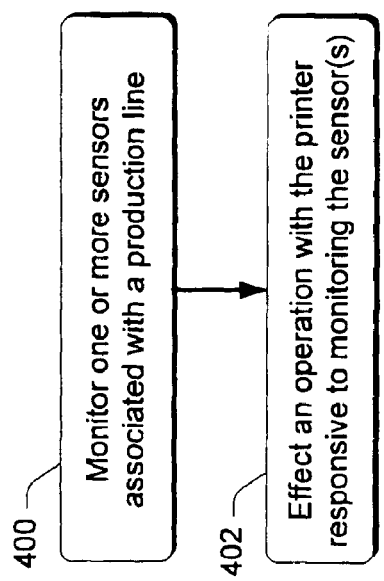
FIG. 4 is a flow diagram that describes steps in a method in accordance with one embodiment.

FIG. 4 is a flow diagram that describes steps in a method in accordance with one embodiment. The method can be implemented in any suitable hardware, software, firmware or combination thereof. In one embodiment, the method can be implemented by a production line monitoring component, such as those described above.

Step 400 monitors one or more sensors associated with a production line. This step can be implemented in any suitable way. For example, sensors can be monitored via a hard line connection between the sensor and a monitoring component. Alternately or additionally, sensors can be monitored wirelessly. In addition, the sensors that are monitored can comprise any suitable sensors that are associated with a production line. Suitable sensors can comprise those that are, for example, associated with individual stations along the production line. Alternately or additionally, suitable sensors can comprise those that are not necessarily associated with an individual station, but are otherwise associated with the production line. Further, the sensors that are monitored can comprise sensors that are upstream and/or downstream from the printer. In various embodiments, the sensors that are monitored comprise those sensors that are not associated with a station comprising the printing station. It is to be appreciated, however, that sensors associated with the printing station can also be monitored.

Step 402 effects an operation with the printer responsive to monitoring the sensor(s). Any suitable operation can be effected, examples of which are given above and below. For example, consider that step 400 monitors the production line and determines that it is running in a steady state. By virtue of knowing the characteristics of the steady state operation of the production line, the production line monitoring component might know that there are windows within which certain service-related operations can be scheduled. Thus, during steady state operation, the production line monitoring component might schedule minor service-related operations that fit within the appropriate windows.

Service-Related Operations

As noted above, one class of operations that can be intelligently administered comprise service-related operations.

Figure 5:
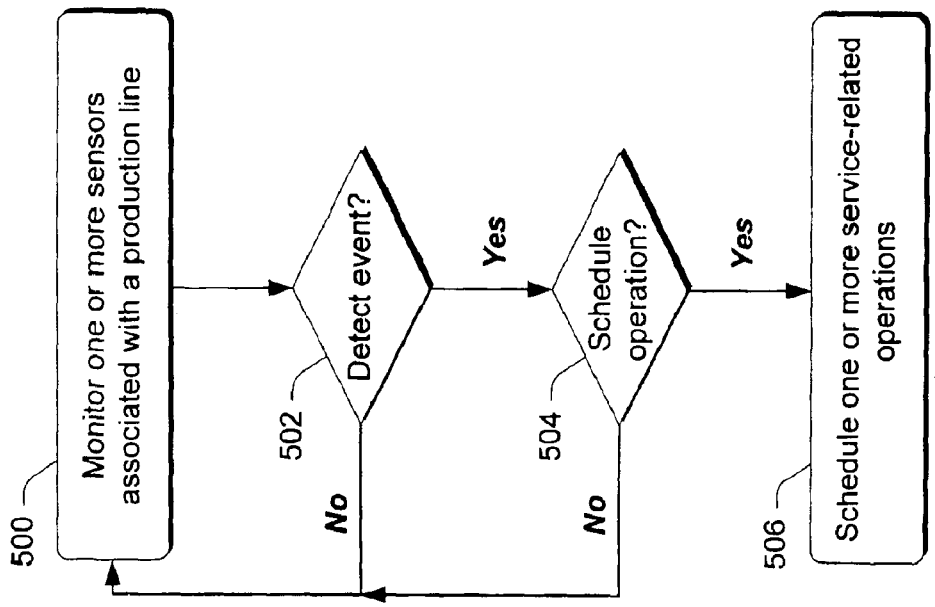
FIG. 5 is a flow diagram that describes steps in a method in accordance with one embodiment.

FIG. 5 is a flow diagram that describes steps in a method of scheduling service-related operations, in accordance with one embodiment. The method can be implemented in any suitable hardware, software, firmware or combination thereof. In one embodiment, the method can be implemented by a production line monitoring component, such as those described above.

Step 500 monitors one or more sensors associated with a production line. Step 502 determines whether an event associated with one or more of the sensors occurs. This step can determine whether any suitable event occurs. For example, one event might correspond to a production line article temporarily jamming at a particular station. Another event might correspond to a production line worker activating an emergency stop button to temporarily stop the production line. Another event might correspond to the production line suddenly accelerating its processing. In one embodiment, step 502 can detect non-printing events, examples of which are given just above. If an event is not detected, the method returns to step 500 to continue monitoring the sensor(s).

If, on the other hand, step 502 determines that an event has occurred, step 504 ascertains whether any service-related operations can be effected during a time period associated with the event. Consider, for example, that production lines typically have different classes of events that occur. These events may tend to repeat themselves from time to time. For example, an article may jam, the production line may be purposely stopped, there may be periodic predictable gaps in the processing that takes place on the production line, and the like. These events may on average, over time, take a certain amount of time to resolve. Using the example of FIG. 2, perhaps events that transpire at station 202 take, on average, three minutes to resolve. On the other hand, events that tend to transpire at station 206 may, on average, take only seconds to resolve. Accordingly, step 504 can ascertain, for a given event, whether any service-related operations can be effected during this time. This step can be performed in any suitable way. For example, a look up table might include a mapping for given events and their associated time to resolve.

If step 504 determines that no service-related operations can be effected during this time, the method can return to step 500 to continue to monitor the sensor(s). If, on the other, one or more service-related operations can be effected during this time period, then step 506 can schedule, if appropriate, one or more service-related operations. For example, if the event mentioned above with respect to station 202 takes place, then steps 504 and 506 might result in a capping and subsequent spitting operation being scheduled. If the event mentioned above with respect to station 206 takes place, then steps 504 and 506 might result in a wiping operation being scheduled.

The method can then return to step 500 to continue monitoring the sensor(s).

In accordance with one embodiment, steps 504 and 506 can be performed as a function of the past operational history of the printer. That is, while an event might be detected by step 502, the past operational history might suggest that a potentially schedulable service-related operation would not be appropriate for scheduling. For example, consider that an inkjet printer on the production line has been operating continuously for the past 35 minutes when an event is detected at one of the stations. Perhaps the event is one that might suggest a spitting operation be scheduled. Yet, since the printer has been operating continuously over the past 35 minutes, a spitting operation might not be the best choice. Rather, because of the past operational history, the better choice might be a wiping operation. Thus, in this embodiment, steps 504 and 506 can take into account the past operational history of the printer to ascertain and schedule a particular service-related operation or operations.

Non-Service Related Operations

There are instances when, for example, monitoring the various sensors on a production line will present an opportunity to the production line monitoring component to effect a operation with the printer that is not a mainstream service-related operation. One example of this is given above where a particular printmode can be selected based on characteristics of the production line as gleaned by the production line monitoring component.

Consider also that certain operations that are performed within the printer can benefit from knowing the state of the production line. For example, by ascertaining characteristics of the production line from the sensors, operations within the printer can be designed to be more efficient or to use resources more efficiently. As an example, consider the printer's memory management. By knowing how the production line operates by monitoring the various sensors, memory management decisions can be made to assist the printer in its operation. Perhaps the state of the production line suggests that certain compression/decompression algorithms should be used. Alternately or additionally, based on the characteristics of the production line, the amount of memory that is utilized for buffering print jobs can be selected to efficiently use the printer's memory resources.

CONCLUSION

By monitoring various sensors along the production line, operational decisions that affect the printer can be made to enhance the printer's operational efficiencies. By managing printers and printer resources in an intelligently adaptive manner, the lifetimes of the printer resources can be increased, the quality of the printing can be enhanced, and the production line can be made to operate in a more efficient manner.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

We claim:

1. A method comprising:
   monitoring one or more sensors associated with a production line;
   determining whether an event associated with one or more of the sensors occurs;
   responsive to an event occurring, ascertaining whether any service-related inkjet printer operations can be effected during a time period associated with the event; and
   if one or more service-related inkjet printer operations can be effected during said time period, effecting one or more service-related inkjet printer operations during said time period.

2. The method of claim 1, wherein said event comprises a non-printing related event.

3. The method of claim 1, wherein said acts of ascertaining and effecting are performed as a function of a past operational history of the inkjet printer.

4. One or more computer-readable media having computer-readable instructions embodied thereon which, when executed by one or more processors, cause the one or more processors to:
   monitor one or more sensors associated with a production line;
   determine whether an event associated with one or more of the sensors occurs;
   responsive to an event occurring, ascertain whether any service-related inkjet printer operations can be effected during a time period associated with the event; and
   if one or more service-related inkjet printer operations can be effected during said time period, effect one or more service-related inkjet printer operations during said time period.

5. The one or more computer-readable media of claim 4, wherein said event comprises a non-printing related event.

6. The one or more computer-readable media of claim 4, wherein:
   said computer-readable instructions which cause the one or more processors to ascertain whether any service-related inkjet printer operations can be effected during a time period associated with the event comprise instructions which cause the one or more processors to ascertain whether any service-related inkjet printer operations can be effected during a time period associated with the event as a function of a past operational history of the inkjet printer; and said computer-readable instructions which cause the one or more processors to effect one or more service-related inkjet printer operations during said time period comprise instructions which cause the one or more processors to effect one or more service-related inkjet printer operations during said time period as a function of a past operational history of the inkjet printer.

7. An inkjet printer comprising:

means for effecting inkjet printing on a print medium;

one or more computer-readable media;

one or more processors;

computer-readable instructions embodied on the computer-readable media which, when executed by one or more processors, cause the one or more processors to:

monitor one or more sensors associated with a production line;

determine whether an event associated with one or more of the sensors occurs;

responsive to an event occurring, ascertain whether any service-related inkjet printer operations can be effected during a time period associated with the event; and if one or more service-related inkjet printer operations can be effected during said time period, effect one or more service-related inkjet printer operations during said time period.

* * * * *